United States Patent
Harrington (12)

(10) Patent No.: US 6,178,007 B1
(45) Date of Patent: *Jan. 23, 2001

(54) METHOD FOR CONTINUOUS INCREMENTAL COLOR CALIBRATION FOR COLOR DOCUMENT OUTPUT TERMINALS

(75) Inventor: Steven J. Harrington, Webster, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/786,010

(22) Filed: Jan. 21, 1997

(51) Int. Cl.[7] .................................................. G06F 15/00
(52) U.S. Cl. ............................................. 358/1.9; 358/518
(58) Field of Search ................................. 395/109, 101, 395/104, 106, 111, 114, 115, 116, 117, 1.9, 1.1, 1.4, 1.6, 1.12, 1.15, 1.16, 1.17, 1.18; 358/504, 406, 500, 501, 502, 506, 518, 527, 523, 529, 519, 525, 524, 520; 347/19; 345/431, 199; 382/167, 162

(56) References Cited

U.S. PATENT DOCUMENTS

| | | | |
|---|---|---|---|
| 2,790,844 | 4/1957 | Neugebauer | 178/5.2 |
| 4,275,413 | 6/1981 | Sakamoto et al. | 358/80 |
| 4,488,808 | 12/1984 | Kato | 356/73 |
| 4,500,919 | 2/1985 | Schreiber | 358/78 |
| 5,416,613 | 5/1995 | Rolleston et al. | 358/518 |
| 5,471,324 | 11/1995 | Rolleston | 358/518 |
| 5,483,360 | 1/1996 | Rolleston et al. | 358/518 |
| 5,491,568 | 2/1996 | Wan | 358/518 |
| 5,508,826 | 4/1996 | Lloyd et al. | 358/501 |
| 5,528,386 | 6/1996 | Rolleston et al. | 358/522 |
| 5,539,522 | 7/1996 | Yoshida | 358/296 |
| 5,581,376 | 12/1996 | Harrington | 358/518 |
| 5,594,557 * | 1/1997 | Rolleston et al. | 358/504 |
| 5,612,902 | 3/1997 | Stokes | 364/526 |
| 5,671,059 | 9/1997 | Vincent | 356/402 |
| 5,748,221 | 5/1998 | Castelli et al. | 347/232 |
| 5,963,244 | 10/1999 | Mestha et al. | 347/251 |

FOREIGN PATENT DOCUMENTS

| | | |
|---|---|---|
| P 42 43 885 | 6/1994 | (DE) . |
| 0 398 502 A3 | 11/1990 | (EP) . |
| 0 741 491 A2 | 11/1996 | (EP) . |
| 0 747 853 A3 | 12/1996 | (EP) . |
| 0 814 400 A2 | 12/1997 | (EP) . |

OTHER PUBLICATIONS

Po–Chieg Hung, "Tetrahedral Division Technique Applied to Colorimetric Calibration for Imaging Media", Annual meeting IS&T, NJ, May, 1992, pp. 419–422.

Po–Chieg Hung, "Colorimetric Calibration for Scanners and Media", SPIE, vol. 1448, Camera and Input Scanner System (1991).

Sigfredol, Nin et al., "Printing CIELAB Images on a CMYK Printer Using Tri–Linear Interpolation", SPIE Proceedings, vol. 1670, 1992, p. 1–9.

* cited by examiner

Primary Examiner—Dov Popovici

(57) ABSTRACT

A method and apparatus for continuously upgrading the color calibration for an electrophotographic printer using a color transform look up table stored in memory. A single or small number of color patch samples are printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

16 Claims, 2 Drawing Sheets

Figure 1:
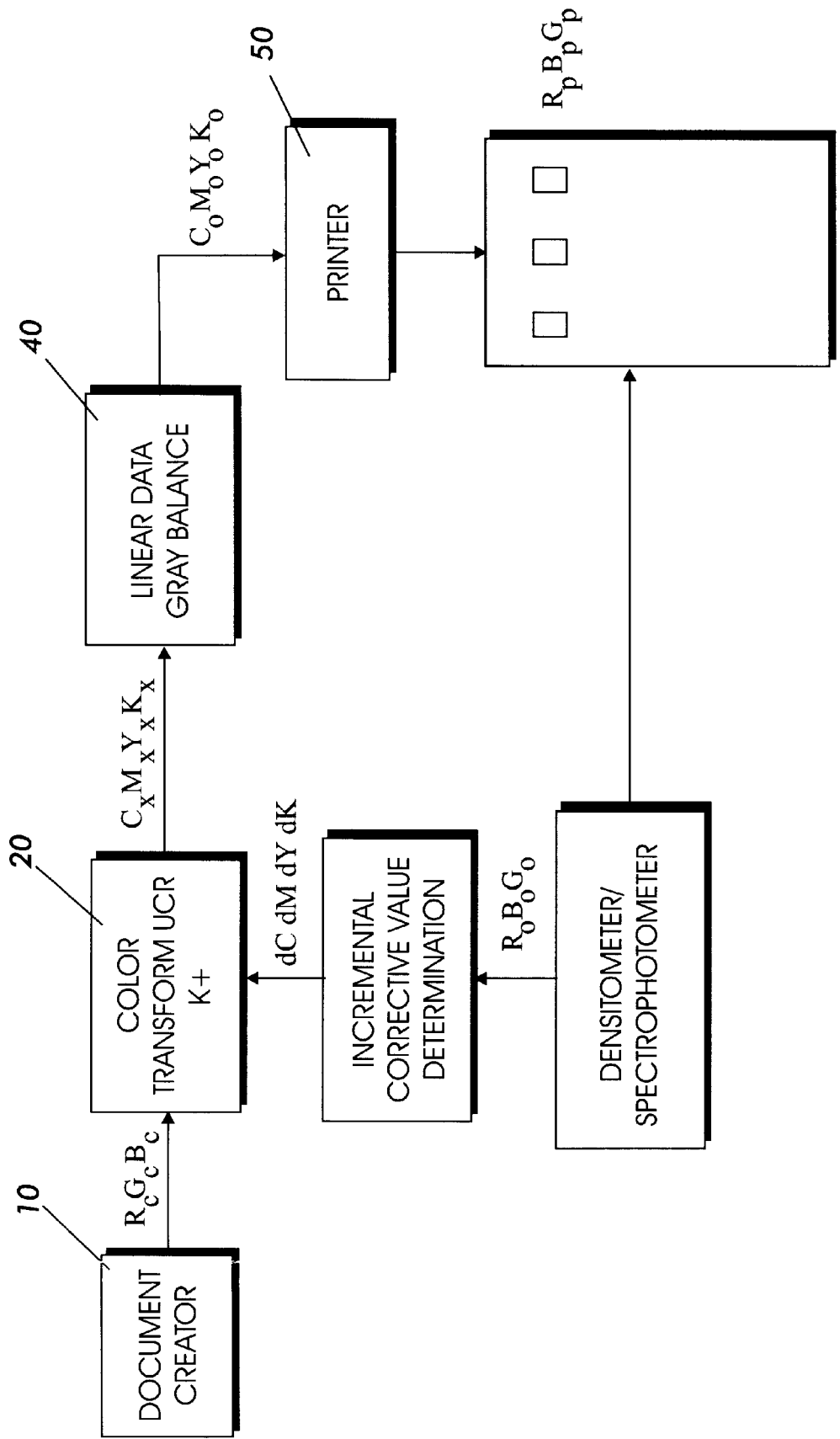

METHOD FOR CONTINUOUS INCREMENTAL COLOR CALIBRATION FOR COLOR DOCUMENT OUTPUT TERMINALS

Cross-reference is made to a commonly assigned and co-pending application Ser. No. 08/787,524, filed on the same date, by Barry M. Wolf, et al and entitled "On-Line Compensation for Slow Drift of Color Fidelity in Document Output Terminals".

This invention describes a method for maintaining the color calibration on a printer that has a color sensor and uses a color look up table for the color correction. The idea is to print, measure and adjust the color for one, or possibly a few entries in the color table at a time. This partial calibration is an ongoing process that eventually covers every table entry.

The following patents are specifically incorporated by reference: U.S. Pat. No. 5,416,613 to Rolleston et al. for its teaching of calibrating the response of a color printer by using a plurality of color patches some of which are repeated at a plurality of spatially disparate locations on the test image; U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system.

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Color corrected scanners commonly operate with colors defined in a color space of tristimulus values, i.e., RGB (red-green-blue). Commonly, these values are a linear transformation of the standard XYZ coordinates of CIE color space, or a correct transform of those values. In the case of computer generated images, colors defined by the user at the user interface of his workstation are immediately converted into color space values and directed out of the system as defined in the document colors.

Printers have an output which can be defined as existing in a color space called CMYK (cyan, magenta, yellow, key or black) which is uniquely defined for the printer by its capabilities and colorants. Printers operate by the addition of multiple layers of ink or colorant in layers or halftone dots to a page. The response of the printer tends to be non-linear. Thus, while a printer receives information in a first color space which has values defined independently of any device, it must convert that information to print in a second color space.

The desirability of operating in a tristimulus color space with subsequent conversion to a printer colorant color space is well known, as shown by U.S. Pat. No. 4,500,919 to Schreiber, U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

The calibration of a printer involves the process of finding what set of signals must be sent to a printer to obtain a desired color. The desired color is described in some device independent terminology (i.e. some well defined standard), and the signals to the printer constitute a device dependent terminology. A complete calibration will transform the device independent color description into a device dependent description such that the resultant combination of materials (i.e. ink, toner, dye, etc.) on the paper produces the desired color (i.e. the color which was initially described in a device independent fashion).

In U.S. Pat. No. 4,500,919 to Schreiber, and U.S. Pat. No. 4,275,413 to Sakamoto, the information derived from patch measuring was placed into lookup tables, stored in a memory, perhaps ROM memory or RAM memory where the look-up table relates input color space to output color space. The look-up table is commonly a three dimensional table since color space is three dimensional. With a scanner or computer, the RGB space can be defined as three dimensional with black at the origin of a three dimensional coordinate system (0,0,0), and white at the maximum of a three dimensional coordinate system which an 8-bit system, would be located at (255, 255, 255). Each of the three axes radiating from the origin point therefore respectively define red, green, and blue. A similar construct can be made for the printer, with axes representing cyan, magenta, and yellow. Black is usually a separate toner which is added separately. In the 8-bit system suggested there will be, however, over 16 million possible colors ($256^3$). There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1,000, or even less. Therefore, the look-up tables consist of a set of values which could be said to be the intersections for corners of a set of rectangular parallelepipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

A common approach to accomplishing calibration of a print system is by generating a set of color patches distributed in color space; printing the patches (in output color space) in a desired output medium like a paper sheet and measuring the color of the patches, typically with a high accuracy densitometer, spectrophotometer or the like to determine what was printed in terms of an input color space. This data can then be loaded into a look-up table. However, it will undoubtedly be understood that due to the vast number of measurements required to perform such a calibration, any continual automatic updating is considered impractical and generally is not performed.

Other references which disclose calibration methods for color printers utilizing look up tables and interpolation schemes include U.S. Pat. No. 5,508,826 to Lloyd et al; U.S. Pat. No. 5,471,324 to Rolleston; U.S. Pat. No. 5,491,568 to Wan; U.S. Pat. No. 5,539,522 to Yoshida; U.S. Pat. No. 5,528,386 to Rolleston et al.; U.S. Pat. No. 5,416,613 to Rolleston et al.; and U.S. Pat. No. 5,483,360 to Rolleston et al.

All of the references cited herein are incorporated by reference for their teachings.

In accordance with one aspect of the invention, there is provided a calibration arrangement for continuously updating the calibration of a color printer, comprising a multicolor printer responsive to electronic signals to print combinations of a plurality of colorants approximating cyan, magenta, yellow and black on a substrate, a memory suitable to store electronic signals suitable to drive the color printer to reproduce a calibration image, said calibration image including; a patch printed on said substrate with combinations of primary subtractive colorants and representing a known possible color within a gamut of said printer, a printer controller, controlling the printer to print the calibration image during normal operations, a sensor suitable for measuring colorimetric response of the printer in printing the calibration image on the substrate in terms of device independent colorimetrics, a device memory storing a look-up table relating device independent colors to printer colorants and a converter to convert the measured calorimetric response of a color printed for a device independent color specification into update values in the look-up table stored in device memory.

Figure 2:
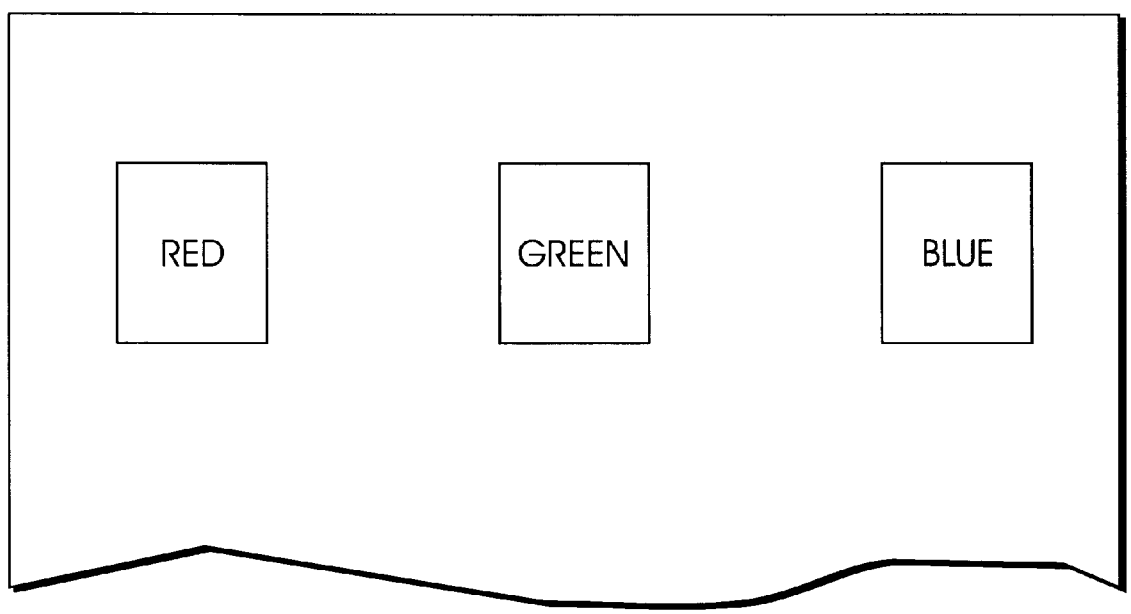

In accordance with another aspect of the invention, there is provided a method of updating the calibration of a color printer, comprising:
  a.) measuring a color patch corresponding to a desired output color;
  b.) determining the difference between said measured color coordinates and the desired color coordinates;
  c.) determining a correction value for the measured patch as a function of the difference between said measured color patch and the desired color output;
  d.) updating a printer color conversion table based on the calculated correction value These and other aspects of the invention will become apparent from the following descriptions to illustrate a preferred embodiment of the invention read in conjunction with the accompanying drawings in which:

FIG. 1 is a block diagram of a printing system with color transformation, for converting device independent image descriptions to device dependent image descriptions; and FIG. 2 is a simplified illustration of a calibration test target in accordance with the invention.

Referring now to the drawings where the showings are for the purpose of describing an embodiment of the invention and not for limiting same, a basic system for carrying out the present invention is shown in FIG. 1. Generally, a source of images, in this case shown as a computer workstation or document creator 10 provides an image defined in colorimetric terms, typically digital in nature R c, G c, B c. Commonly this description may be part of a Page Description Language (PDL) file describing the document in device independent terms. The calorimetric terms may reference CIE color space (L*a*b* for example), calorimetric RGB, luminance-chrominance space (LC1C2), etc. A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values C x, M x, Y x, K x. Commonly, color space transform 20 is a look-up table, receiving as addresses or indexes device independent signals describing the image, and producing as a responsive output a device dependent signal. In an example 8 bit per pixel/separation system, over 16 million mappings would be required. Accordingly, coupled with the look-up table is an interpolation arrangement, such as described in U.S. Pat. No. 4,275,413 to Sakamoto, or in copending U.S. patent application Ser. No. 08/131,168, filed Oct. 4, 1993, entitled "Reduced Storage of Pre-Computed Difference Tables Used in Color Space Conversion" by R. Rolleston, which provides interpolated output colors as an interpolated function of the closest mapped output colors. Upon obtaining device dependent colorant signals C x, M x, Y x, under color removal and black addition (K+) is performed or alternatively, Kx may also be found by table lookup. Subsequent to black addition, at linearization and gray balance 40, the color values are linearized, so that linearly increasing values of colorants produce a linearly increasing colorimetric response. The linearization process is implemented via a set of look-up tables storing the responses of a set of patches generated at a set of input values, where a curve fitting routine is used to map the set of possible input responses to characterized output responses. Rather than linearizing the color values, so that linearly increasing values of colorants produce a linearly increasing colorimetric response, the color values may be gray balanced, so that equal amounts of color produce a neutral gray response at the printer. The gray balance process is also implemented via a set of look-up tables storing the responses of a set of patches generated at a set of input values, where a curve fitting routine is used to map the set of possible input responses to characterized output responses. It is also possible to combine the linearization with the three-dimensional color transform so that only a single table lookup and interpolation is required, but this can lead to greater errors in the interpolation. Whichever system is used, the new values C p, M p, Y p, K p are then used to drive printer 50. In one possible example, the colorant values represent the relative amounts of cyan, magenta, yellow and black toners that are to be deposited over a given area in an electrophotographic printer, such as the Xerox 4700 digital color printer. The printed output image may be said to be defined in terms of R p, G p, B p, which is hoped to have a relationship with R c, G c, B c such that the printed image has a color that is colorimetrically similar to the original image, although similarity is ultimately dependent upon the gamut of the printing device.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324.

As discussed above, modern color printers often receive color specifications in a device independent format. The printer so and controller 100 must then convert these color specifications into amounts of colorants to use in order to produce the desired color. Because printers are typically non linear in their behavior, one often finds a color look up table and interpolation used to find the colorant amounts for a desired color value. The look-up table gives colorant amounts for a grid of color specifications. For colors falling between the grid points, interpolation is used. The look-up tables typically employ and 8×8×8 (512 grid points) or a 16×16×16 (4096 grid points). The process of determining the proper table entries for the printer is known as color calibration. It is typically a fairly involved process requiring the printing and measuring of hundreds or thousands of color patches, and the interpolation of the measured values to determine color table entries. As the process is involved and normally requires human intervention, color calibration is only rarely performed. Printer behavior can drift over time and color table values can become inappropriate causing significant color errors before the user is willing to make the effort of recalibration.

It would be desirable for the printer to continuously recalibrate itself, without human intervention. This way it could constantly adjust for any drift in the machine behavior and always produce correct colors.

It is possible to place a color sensor such as a densitometer or spectrophotometer within the printer and to measure the value of a color patch as it moves past the sensor. The sensor can measure the color of patches placed at appropriate locations on a piece of paper such as that illustrated in FIG. 2. It is also possible to measure the color placed on a photoreceptive drum or belt within the device where the color can be formed prior to transfer to paper. Such sensors, however, can only measure a few color patches on a page, not the hundreds or thousands needed for a full calibration. Because of this, it has been felt that automatic calibration is impractical, even when such a sensor is included in the printer.

This invention makes automatic update of the color look-up table possible by employing a continuous stream of partial calibrations. One may still need to do an initial full calibration to provide initial values for the color table, but thereafter the printer will adjust and maintain the table, compensating for drifts and changes in the machine. The idea is that each partial calibration may inspect and adjust only a few of the table entries. Perhaps only a single table entry is examined on each cycle. The next partial calibration will adjust another entry in the table. The process of partial calibrations will be ongoing so that eventually every table entry will be examined, at which point the sequence of adjustments can be repeated.

To adjust an entry in the table we do the following: Suppose the entry in question has index (i, j, n), and this corresponds to ideal color R(i, j, n), G(i, j, n) B(i, j, n). We print a color patch using the colorant amounts specified in the table for this entry C(i)(j)(n), M(i)(j)(n), Y(i)(j)(n), K(i)(j)(n). This patch is then measured with the sensor to give the true color produced R' G' B'.

The relationship between the color table index and the desired color value is, of course, known, and the partial derivatives ($\partial i/\partial R$, $\partial i/\partial G$, $\partial i/\partial B$, $\partial j/\partial R$, $\partial j/\partial G$, $\partial j/\partial B$, $\partial n/\partial R$, $\partial n/\partial G$, $\partial n/\partial B$) can be determined. Typically the indices are related to the color values by a simple scale.

We calculate the difference between the desired color value and the actual color produced.

$$dR=R(i,j,n)-R'\ dG=G(i,j,n)-G'\ dB=B(i,j,n)-B'$$

This and the partial derivatives can be used to determine an approximate adjustment in the index needed to correct the look-up table.

$$di=(\partial i/\partial R)dR+(\partial i/\partial G)dG+(\partial i/\partial B)dB$$

$$dj=(\partial j/\partial R)dR+(\partial j/\partial G)dG+(\partial j/\partial B)dB$$

$$dn=(\partial n/\partial R)dR+(\partial n/\partial G)dG+(\partial n/\partial B)dB$$

This index adjustment can be converted to a colorant adjustment provided we know the behavior of the colorant with respect to index. These partial derivatives can be approximated by examining neighboring values in the color table.

$$\partial C/\partial i=(C(i+1, j, n)-C(i-1, j, n))/2$$

$$\partial C/\partial j=(C(i, j+1, n)-C(i, j-1, n))/2$$

$$\partial C/\partial n=(C(i, j, n+1)-C(i, j, n-1))/2$$

Similar expression give $\partial M/\partial i$, $\partial M/\partial j$, $\partial M/\partial n$, $\partial Y/\partial i$, $\partial Y/\partial j$, $\partial Y/\partial n$, $\partial K/\partial i$, $\partial K/\partial j$, $\partial K/\partial n$. The adjustment to the colorant is then $$dC=(\partial C/\partial i)di+(\partial C/\partial j)dj+(\partial C/\partial n)dn$$

$$dM=(\partial M/\partial i)di+(\partial M/\partial j)dj+(\partial M/\partial n)dn$$

$$dY=(\partial Y/\partial i)di+(\partial Y/\partial j)dj+(\partial Y/\partial n)dn$$

And if the K value is taken directly from the lookup table, then $$dK=(\partial K/\partial i)di+(\partial K/\partial j)dj+(\partial K/\partial n)dn$$

The values dC, dM, dY, and dK should be added to their corresponding components in the color table entry C(i)(j)(n), M(i)(j)(n), Y(i)(j)(n), K(i)(j)(n) to obtain the updated entry values.

Note that one need only update those entries for colors which lie within the printer's gamut. For grid points on or near the gamut boundary the partial derivatives may have to be approximated somewhat differently. We are not able to take the difference of neighboring grid point values on each side of the boundary point if one of these neighbors lies outside of the gamut. Instead, we can use the current point and a neighbor that is within the gamut. For example:

$$\partial C/\partial i=C(i, j, n)-C(i-1, j, n)$$

Note also that while we have shown a linear interpolation of the grid points used to approximate the derivative, alternate (e.g. higher order) interpolations can be used.

One might also choose to adjust the color index by something less in magnitude than (di, dj, dn). This might offer greater stability in converging to the desired correction table.

The sample patch used to adjust the color of a table entry could be printed on the break page between jobs; or where long runs are the rule, one might print the test patches periodically on a page that will be discarded. It may be possible to print several test patches on the break page or test page (along the strip of the page that will pass across the sensor). This would allow several table values to be adjusted with each such printing.

In recapitulation, there is provided a method and apparatus for continuously upgrading the color calibration for an electrophotographic printer using a color transform look up table stored in memory. A single or small number of color patch samples are printed at regular intervals during the use of the printing machine. The color patches are sensed and a determination made as to the difference between the sensed color and the desired color. A corrective color calibration value is determined for the sensed patch and a correction is made for that color in the printer memory. The process is repeated to assure that all of the colors within the gamut of the machine are continuously updated.

It is, therefore, apparent that there has been provided in accordance with the present invention, a color calibration method and device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A color printer color calibration system for updating color calibration values for a color printer, which said color printer during normal printing operations is responsive to device-independent electronic printing signals to print normal color images of selectable combinations of a plurality of printer colorants on print substrates, wherein a device memory controls said color printer by initially storing a look-up table with a large amount of stored information relating said device-independent electronic printing signals to said printing of printer colorants to provide the initial color calibration values for said color printer; comprising:

a memory for storing electronic color calibration signals which are suitable for printing color calibration patches with said color printer, a color calibration image generation system for automatically printing plural different color calibration patches on selected said print substrates with said printer colorants from said electronic color calibration signals stored in said memory;

a printer controller controlling said color printer and said color calibration image generation system to print said color calibration patches on selected said print substrates during said normal printing operations;

a color sensor associated with said color printer for measuring the color of a color calibration patch printed on a print substrate by said color printer; and a converter for sequentially converting said color of said color calibration patch printed on said print substrate measured by said color sensor into an color calibration update value for a small portion of said large amount of stored information in said look-up table, wherein said color calibration image generation system automatically prints different said color calibration patches during said normal printing operations to incrementally update said large amount of stored information in said look-up table relating said device-independent electronic printing signals to said printing of printer colorants during said normal printing operations.

2. The color printer color calibration system of claim 1 wherein said color calibration image generation system automatically periodically prints a sufficient multiplicity of different said color calibration patches during said normal printing operations to gradually incrementally update said look-up table in said device memory of stored information relating said device-independent electronic printing signals to said printing of printer colorants.

3. The color printer color calibration system of claim 1 wherein said color sensor is directly associated with said color printer for measuring the color of said color calibration patch printed on said print substrate in device-independent colorimetrics.

4. The color printer color calibration system of claim 1 wherein said color sensor is mounted within said color printer to measure the color value of said color calibration patches as said print substrates move past said color sensor.

5. The color printer color calibration system of claim 1 wherein said print substrates printed with said color calibration patches are printed on a break page between print jobs of said normal printing operations.

6. The color printer color calibration system of claim 1 wherein during long print jobs of said normal printing operations at least one of said print substrates printed with said color calibration patches is periodically printed on discardable said print substrates.

7. A method of updating color calibration values for a color printer, which said color printer during normal printing operations is responsive to device-independent electronic printing signals to print an output of normal color images of selectable combinations of a plurality of printer colorants on print substrates, wherein said color printer is controlled by initially storing a look-up table with a large amount of stored information relating said device-independent electronic printing signals to said printing of printer colorants to provide the initial color calibration values for said color printer; comprising;

automatically printing with said printer colorants a limited number of color calibration patches corresponding to desired printer output colors on a limited number of said print substrates during said normal printing operations;

measuring color coordinates of said color calibration patches printed on said print substrates with a color sensor directly associated with said color printer;

converting said color coordinates of a color calibration patch printed on a print substrate as measured by said color sensor into a color calibration update value for said look-up table; and automatically incrementally repeating during said normal printing operations said printing of limited numbers of additional different said color calibration patches on limited numbers of said print substrates, and automatically repeating said measuring and converting steps therefrom, to incrementally update only a small portion at a time of said large amount of stored information in said look-up table relating said device-independent electronic printing signals to said printing of printer colorants.

8. The method of updating color calibration values for a color printer of claim 7, wherein said automatically repeating step is a systematic sampling system with only one or a few of said print substrates being printed at a time in between said printing of the normal color images.

9. The method of updating color calibration values for a color printer of claim 7, wherein multiple varying color said color calibration patches are printed on each of selected said print substrates.

10. The method of updating color calibration values for a color printer of claim 7, wherein said automatically repeating step is a systematic sampling system with only one or a few of selected said print substrates being printed at a time in between said printing of the normal color images, and wherein multiple varying said color calibration patches are printed on each of selected said print substrates, and determining the difference between said measured color coordinates of each said color calibration patch and desired color coordinates, so as to slowly update the entire said color calibration values for said color printer over a substantial time period during said normal printing operations.

11. The method of updating color calibration values for a color printer of claim 7, wherein said color sensor is directly associated with said color printer for measuring the color of said color calibration patch printed on said print substrate and measures said color calibration patch in device-independent colorimetrics.

12. The method of updating color calibration values for a color printer of claim 7, wherein a continual incremental updating of substantially all of said color calibration values is automatically provided during said normal printing operations.

13. The method of updating color calibration values for a color printer of claim 7, wherein said color sensor is mounted in said color printer to sense the colors on said color calibration patches as said print substrates are moved past said color sensor.

14. The method of updating color calibration values for a color printer of claim 7, wherein during a long print run of said normal printing operations at least one of said print substrates printed with said color calibration patches is periodically printed on discardable said print substrates.

15. The method of updating color calibration values for a color printer of claim 7, wherein said color printer is a xerographic printer.

16. The method of updating color calibration values for a color printer of claim 7, wherein said color calibration patches are printed on said print substrates which are break pages in between print jobs of said normal printing operations.

* * * * *